Figure 1:
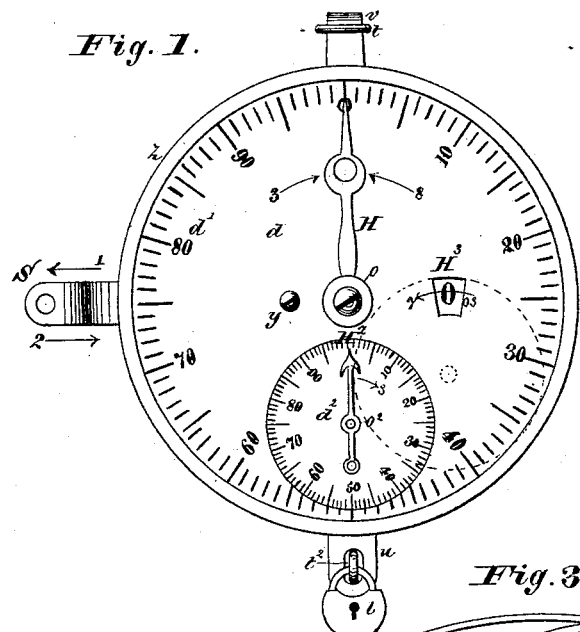

2 Sheets—Sheet 1.

J. W. FOWLER, D. F. LEWIS, W. H. SMITH, & L. FISCHER.
PASSENGER REGISTER.

No. 190,021. Patented April 24, 1877.

WITNESSES
Chas. J. Gooch
L. S. Bloud Burdett.

INVENTORS
John W. Fowler
Daniel F. Lewis
Willard H. Smith
Louis Fischer
By Knight Bros
Attorneys 2 Sheets—Sheet 2.
J. W. FOWLER, D. F. LEWIS, W. H. SMITH, & L. FISCHER.
PASSENGER REGISTER.
No. 190,021. Patented April 24, 1877.
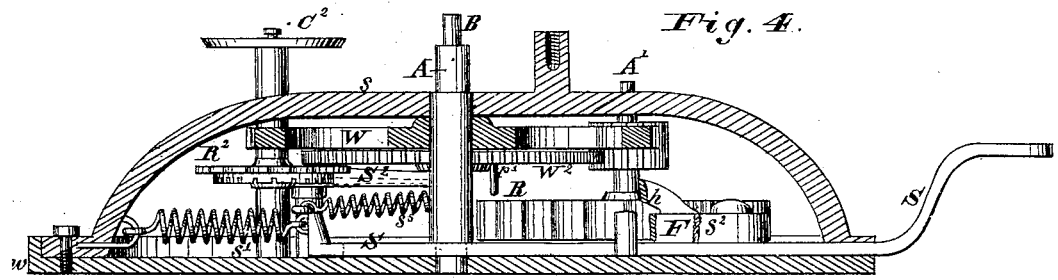
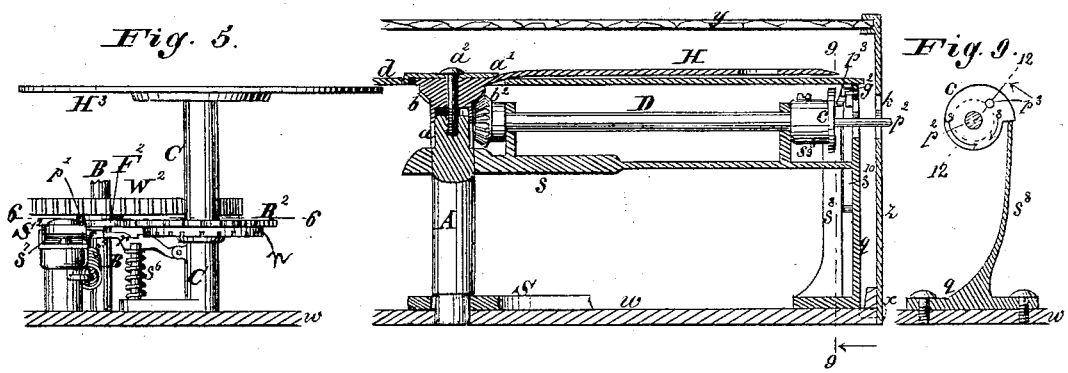
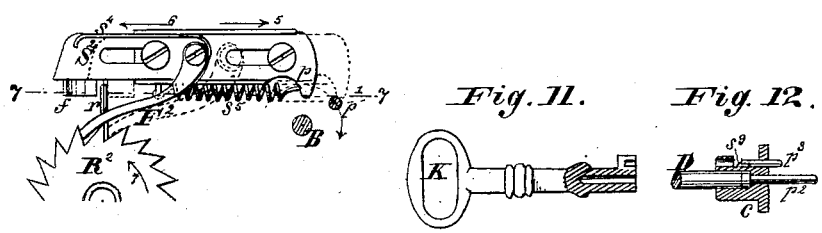
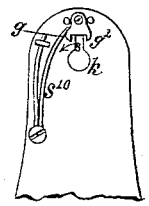
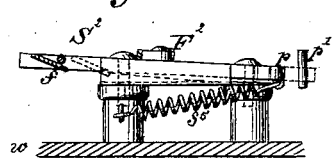
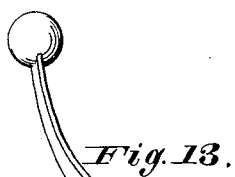
WITNESSES
Chas J Gooch
Le Blond Burdett
INVENTORS
John W Fowler
Daniel F Lewis
Willard H Smith
Louis Fischer
By Knight Bros
Attorneys
N. PETERS, PHOTO-LITHOGRAPHER, WASHINGTON, D. C.

UNITED STATES PATENT OFFICE.

JOHN W. FOWLER, DANIEL F. LEWIS, WILLARD H. SMITH, AND LOUIS FISCHER, OF BROOKLYN, NEW YORK; SAID SMITH AND FISCHER ASSIGNORS TO SAID FOWLER AND LEWIS.

IMPROVEMENT IN PASSENGER-REGISTERS.

Specification forming part of Letters Patent No. 190,021, dated April 24, 1877; application filed March 10, 1877.

*To all whom it may concern:*

Be it known that we, JOHN W. FOWLER, DANIEL F. LEWIS, WILLARD H. SMITH, and LOUIS FISCHER, all of the city of Brooklyn, and county of Kings, in the State of New York, have jointly invented a certain Improved Passenger-Register, of which the following is a specification:

The primary general object of this invention is to accomplish by novel and superior means the effect aimed at in those several forms of passenger-registers now in use on street-cars, in which means for indicating the number of fares taken in a given trip, or between any two points, and means for counting or registering continuously the indications of all the trips up to a large amount, are embodied with an alarm-bell in each instrument or machine, so that any manipulation of the trip-register which causes it to indicate a less number than the alarms struck during a given trip will be detected by means of the continuous register, which is irreversible.

In our improved register, besides the above feature, and simple and convenient means for resetting the trip-register at zero after its indication is taken, provision is also made, by peculiar and efficient devices, for limiting the independent movement of the trip-register to this scope, and for insuring the resetting of the same at zero, and nothing less, so that the whole number of passengers must be regularly registered by sounding the alarm, in order to indicate such registration.

The basis of this improved register is the well-known stem-setting watch, in which the minute and hour hands can be moved at will to any indication, while the seconds-hand revolves continuously in one direction only. The dials of the register have each one hundred divisions, instead of sixty; a "trip-hand" occupies the position of the minute-hand; an irreversible "permanent hand" occupies the position of the seconds-hand; and the latter, with a peculiarly-actuated rotary dial for indicating hundreds, constitutes the "continuous register."

The first part of the invention, hereinafter described and claimed, consists in a combined feed-pawl and hammer, carried by a slide, and serving to propel a ratchet driving-wheel one notch and subsequently to strike an alarm-bell with superior efficiency at each actuation. The shaft of the ratchet-wheel carries the trip-hand, and is connected by spur-gearing to the shaft of the permanent hand.

The second part of the invention consists in a peculiar device for transmitting motion from the shaft of the permanent hand to that of the rotary hundreds-dial, or its equivalent, so that the latter shall move instantaneously when the permanent hand reaches zero, and not before.

The third part of the invention consists in a peculiar device for locking and unlocking the hundreds-shaft after and preliminary to its actuation by said means.

The fourth part of the invention consists in a peculiar combination of parts for setting the trip-hand at zero at will, and for stopping the same at zero.

The fifth part of the invention consists in a peculiar combination of parts for operating the setting-shaft by means of a key in such a manner that the trip-hand must of necessity be turned backward, and set at zero, when turned at all by this means. This is accomplished by limiting the motion of the key, and preventing its withdrawal until the trip-hand is properly set.

The sixth part of the invention consists in the peculiar combination of parts whereby units (to 100) are simultaneously registered on two dials. An alarm is sounded after each unit is registered, and the hundreds are registered on another dial, by the actuation of one and the same slide, or its equivalent, as hereinafter more fully set forth.

Figure 2:
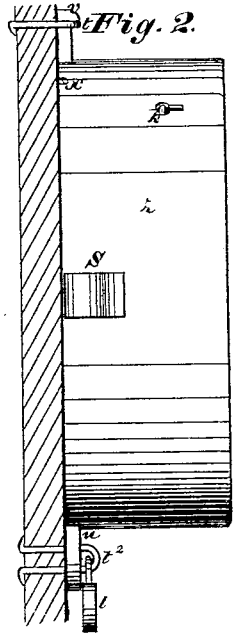
Figure 3:
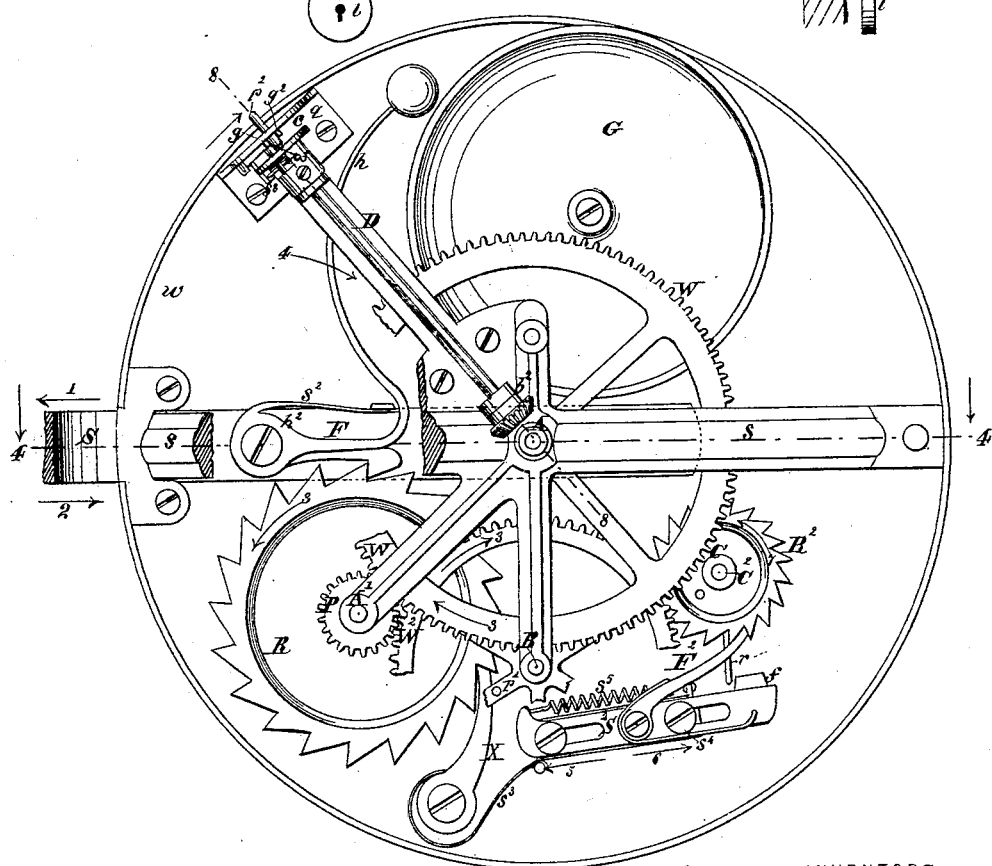

Figure 1 is a face view of a passenger-register illustrating this invention. Fig. 2 is an edge view of the same. Fig. 3 is a face view on a larger scale, with the case and dial plates removed, and portions of the frame and gearing broken away to expose the parts behind. Fig. 4 represents a section on the line 4 4, Fig. 3, showing the driving-slide and parts attached thereto in elevation. Fig. 5 is an elevation of the hundreds-carrying mechanism;

Fig. 6, a sectional plan of the same in the plane indicated by the line 6 6, Fig. 5, illustrating the operation; and Fig. 7, a section on the line 7 7, Fig. 6. Fig. 8 represents a section of the trip-hand, main dial, and case on the line 8 8, Fig. 3, showing an elevation of the setting-shaft and its appurtenances; Fig. 9, a section on the line 9 9, Fig. 8, showing a face view of the zero-guard; Fig. 10, a back view of the key-guard and its support; Fig. 11, an elevation of the key, partly in section; and Fig. 12, a section on the line 12 12, Fig. 9, showing the swiveled key-pin and spring stop-pin in elevation. Fig. 13 is a perspective view of the combined feed pawl and hammer detached. Figs. 3 to 13, inclusive, are drawn to one and the same scale.

Like letters of reference indicate corresponding parts in the several figures.

This improved passenger-register has been constructed with a circular case, consisting of a sheet-metal ring or drum, $z$, and a glass face-plate or front, $y$, and attached by screws $x$ to a metallic back plate, $w$.

A hook-shaped projection, $v$, at top, and a hasp, $u$, at bottom, formed on the edges of the back plate $w$, engage, respectively, with a horizontal staple, $t$, and a vertical staple, $t^2$, driven into a fixed support, and a small padlock, $l$, is applied to the staple $t^2$ to secure the register in position, as shown in Figs. 1 and 2.

A dial-plate, $d$, supported parallel to the back plate $w$, behind the glass $y$, is marked with two dials, $d^1$ $d^2$, and is pierced with orifices $o$ $o^2$ $o^3$. The dial $d^1$ is concentric with the case, and as large as the dial-plate will admit. The dial $d^2$ is small, and is arranged within the dial $d^1$. Each dial is graduated to register one hundred units.

A shaft, A, occupies the central orifice $o$, and carries a trip-hand, H, around the dial $d^1$. This trip-hand is so termed because adapted and intended to indicate the number of passengers carried each trip or any part of a trip, beginning every trip or part of a trip at zero.

A shaft, B, occupies the orifice $o^2$, which is concentric with the dial $d^2$, and carries a "permanent hand," $H^2$, and a hundreds-dial, $H^3$, of twenty spaces, is carried by a shaft, C, behind the dial-orifice $o^3$, so as to expose one number at a time therethrough. These parts revolve in one direction only, and show the sum of the indications of all the trips, constituting, with their actuating mechanism, a continuous register.

A bell or gong, G, attached to the back plate $w$, and covered by the dial-plate $d$, provides for sounding an alarm for every unit registered.

The shafts A B are journaled in the back plate $w$, and in a yoke-frame or spider, $s$, attached to the face of said back plate, and are driven by peculiar mechanism, shown in Figs. 3 and 4, which will now be described.

A slide, S, projecting through the case of the register at one edge, and there embraced and guided by one foot of the frame $s$, is slotted to embrace the central shaft A for another guide, and a retracting-spring, $s^1$, is attached to its inner end. This slide reciprocates, as indicated by arrows 1 2, and carries a combined feed-pawl and bell-hammer, F, and the latter meshes with a ratchet-wheel, R, on a shaft, A', parallel to the shafts A B, and propels these shafts and the hands H $H^2$, through a pinion and spur-wheels, P W $W^2$, on the respective shafts. The motions thus received and transmitted are indicated by arrows 3. The ratchet-wheel R and pinion P have each twenty teeth, and the spur-wheels W $W^2$ have each one hundred teeth, so that each movement of the ratchet-wheel the space of one tooth will move the hands H $H^2$ each one space on the dials $d^1$ $d^2$. A single long pinion serves, preferably, to drive both spur-wheels, and the latter may be of one and the same size and pattern.

A tail-spring, $s^2$, attached to the hub of the feed-pawl and hammer F keeps the pawl end of the same in mesh with the teeth of the ratchet-wheel R with sufficient force to strike the bell or gong G with the hammer end when the pawl is brought opposite an interdental space by the retraction of the slide S. The hammer moves bodily away from the bell in the outward movement of the slide which actuates the registers, and in the return movement it is first elevated or set, and then tripped by the inclined back of that tooth which has last been used. The arrow 4, Fig. 3, indicates the final motion of the hammer. A very effective blow is thus struck, the tail-spring $s^2$ being aided by the retracting-spring $s^1$.

In order that the vibrations of the bell, as imparted to the hammer, shall not impair the latter as in others now in use, the hammer is constructed with a long tapering shank, $h$, merged gradually in the pawl proper, and the hub $h^2$, which is common to both, the ball or knob of the hammer being attached to the small outer end. The shank is also bent in easy curves to increase the effect of its peculiar construction. This is, briefly, a diffusion of the vibrations which the hammer receives, so that they can have no effect on its fiber. The ordinary shanks are rendered brittle by the strains to which they are subjected, and break off in great quantities.

An ordinary stop-pawl, X, with spring $s^3$ prevents any backward movement of the ratchet-wheel R, and thus secures the train P W $W^2$ and shafts A B against retrogression.

The shafts C of the hundreds-dial $H^3$ is a sleeve-shaft mounted on a fixed stud-shaft, $C^2$. For transmitting a step-by-step motion to the hundreds-dial, so that it will move one space when the permanent hand $H^2$ reaches zero, and not before: the spur-wheel $W^2$ on the shaft of said permanent hand is provided with a pin, $p^1$, projecting from its back; a second slide, $S^2$, having a notch or projection, $p$, and carrying a second feed-pawl, $F^2$, with its spring $s^4$, is arranged partially within the orbit of said pin; and a second ratchet-wheel, $R^2$, of twenty teeth, is secured on the sleeve-shaft C in the path of this pawl. This mechanism is shown in detail in Figs. 5 to 7, inclusive, and also in Figs. 3 and 4. The slide $S^2$ is slotted to receive screws, by which it is attached to posts on the back plate $w$, said screws forming guides also, while the slots determine the extent of its motion. A spring, $s^5$, is attached to the slide, so as to impart thereto its effective stroke. The shoulder $p$ projects within the orbit of the pin $p^1$, and is engaged thereby when the permanent hand is several spaces from zero. The continued motion of the wheel $W^2$ now causes the slide $S^2$ to move in the direction of the arrows 5 until the slide occupies the position indicated by dotted lines in Fig. 6. At the next movement of the wheel, which brings the permanent hand to zero, the pin is disengaged from the shoulder, the slide $S^2$ and pawl $F^2$ are instantly restored by the spring $s^5$ in the direction of the arrows 6 to their normal position, indicated by full lines in Fig. 6, and the ratchet-wheel $R^2$ and dial $H^3$ are moved one space, as indicated by arrows 7.

For locking the shaft C after its movements a notched crown-flange, $n$, is formed on the back of the ratchet-wheel $R^2$. A lever, $r$, is fulcrumed within the circle of this flange by a little pivot attaching it to the foot of the stud-shaft $C^2$, and a spring, $s^6$, is arranged behind the lever, so as to tend to hold the same in mesh with the notches of the flange $n$, which correspond with the teeth of the wheel $R^2$. For unlocking the same, the slide $S^2$ is provided with an inclined fin or flange, $f$, in the plane of the outer end of the lever $r$, and a spring, $s^7$, Fig. 5, is arranged behind the slide, as a portion of its support, so as to adapt it to be pressed inward by the action of the lever and incline, when the latter is carried behind the former by the motion of the slide in the direction of the arrows 5. The end of the lever may be adapted to yield as a substitute arrangement, and the lever may, if preferred, be provided with the incline, in combination with a pin on the slide, without changing the effect, which is the depression of the lever $r$ backward during the first part of the return movement of the slide $S^2$ in the direction of the arrows 6. Subsequently the pawl $F^2$ acts on the released ratchet-wheel.

To provide for setting the trip-hand H back to zero after its indication is taken, its hub $a$, Fig. 8, is made to embrace the outer end of the shaft A, and is clamped by an axial screw, $a^2$, and washer $a^1$, but so as to rotate independently of the shaft when a moderate pressure is applied to the hand. A pawl-and-ratchet connection with the shaft may be employed, if preferred. The hub $a$ is also provided with one of a pair of small bevel-gears, $b\ b^2$ both of one size, the other of which is keyed on the inner end of a radial shaft, D. This shaft extends outward to a key-hole, $k$, in the sheet-metal drum $z$ of the case. A key, K, for turning the hand is thus admitted and applied without an orifice in the glass front of the case.

To stop the trip-hand at zero when it is thus actuated, a flange or collar, $c$, Figs. 8 and 9, is constructed with a peripheral notch or shoulder corresponding with zero, and is attached to the shaft D and engaged by a fixed stop-spring, $s^8$, said notch or shoulder being formed by a volute curve in the proper direction, so that the notch or shoulder shall not obstruct the movement of the hand and shaft when they are actuated by the operation of the slide S in the event of the registration of more than one hundred passengers during a trip or the given period.

The guard-flange $c$ is arranged at the extremity of the shaft D, so that it will attach a swiveled guide-pin, $p^2$, Figs. 8, 9, and 12, which is accommodated by a smaller axial bore in line with the main bore of the hub, the latter being made sufficiently deep to accommodate the collar or head of the pin. The swiveled axial pin forms a convenient guide for the key, the latter being bored to fit over it, as shown in Fig. 11, while it guards the shaft D against manipulation by means of pliers.

The flange $c$ serves also to accommodate a pin, $p^3$, same figures, for the key to engage with, and this pin is adapted to slide inward, and is projected by a spring, $s^9$, so that if it is opposite the key-hole, the key may be introduced without difficulty, the end of the key-bit pressing in the pin $p^3$ before it.

To prevent turning the trip-hand back to a false indication, instead of to zero, through collusion of a conductor and the registrar or other officer who carries the key K, a double guard-pawl or a pair of pawls, $g\ g^2$, with its spring $s^{10}$, Figs. 8 and 10, is supported by a bracket, $q$, through which the key-hole $k$ is extended. This bracket projects from the back plate $w$, and serves also to support the stop-spring $s^8$. The square faces and inclined or curved backs of the pawls $g\ g^2$ are the reverse of those of the stop-flange $c$, in direction, and one of the pawls occupies a position on each side of the narrow slit of the key-hole, and extends inward to the flange $c$, or nearly so. The key, when introduced, can consequently be turned in one direction only, (indicated by arrow 8 in Fig. 10,) and only thus by lifting the pawl $g$. Turned in this direction it comes in contact with the pin $p^3$ wherever it may be in its circuit, and, pressing against this, it rotates the shaft D, gears $b\ b^2$, hub $a$, and trip-hand H, in the directions of the arrows 8. Finally, the key lifts the guard-pawl $g^2$ and brings the trip-hand to zero, the shoulder of the flange $c$ abutting simultaneously against the stop-spring $s^8$. The key can only be withdrawn now, as its rotation is prevented in one direction by the stop-spring $s^8$; and in the other by the supports of the pawl $g^2$; and any attempt to leave the hand at any false indication by reversing the key before it reaches this pawl is met by the face of the pawl $g$, which prevents the passage of the key backward thereunder. Consequently the key when once introduced, and turned, cannot be withdrawn until it leaves the trip-hand at zero. The pawls are made to fill the space between their support and the guard-flange, so that they cannot be avoided by a skeleton key. To provide for the passage of the pin $p^3$ in the forward movement of the trip-hand, the inner surface of the guard-pawls is cut away or grooved, as shown in Figs. 8 and 10.

The registering capacity of the instrument above described is 2,000, and at the end of this limit the continuous register begins again at 1. The said capacity can readily be extended indefinitely by a simple train like those of gas-meters, or by any preferred mechanism. The graduation of the dials may be varied also, if preferred, the wheels to be correspondingly modified.

Although we have described, and primarily intend, our improved register as a passenger-register for street-cars, it is equally adapted, and is designed, for registering fares or uniform payments whenever they are taken in sufficient number or under such circumstances as to render a register desirable. It is also adapted and intended for registering the reception or delivery of packages, loads, and the like, and generally wherever a register is or can be used.

The register may be operated by the direct application of the hand to the slide S or to a strap or other handle attached thereto, or by any mechanical device, either automatic or otherwise, in any known or preferred way. Two or more registers will be used for registering different fares or the like.

The following is what we claim as our invention, and desire to secure by Letters Patent, namely:

1. The feed-pawl and hammer F, arranged and operating as described, in combination with the ratchet-wheel R, bell or gong G, spring-retracted slide S, and pawl and hammer spring $s^2$, for rotating the trip-hand shaft, and subsequently sounding an alarm, at each actuation of said slide, in the manner herein set forth.

2. The slide $S^2$ carrying the feed-pawl $F^2$, and constructed with the shoulder $p$, in combination with the ratchet-wheel $R^2$ on the shaft of the hundreds-dial, the wheel $W^2$ and its pin $p^1$, and the retracting-spring $s^5$, substantially as shown, for moving the hundreds-shaft instantly when the permanent hand reaches zero.

3. The combination of the inclined pin or flange $f$, notched crown-flange $n$, lever $r$, and spring $s^6$, with the slide $S^2$, and ratchet-wheel $R^2$, substantially as shown, for locking and unlocking the hundreds-shaft, in the manner set forth.

4. The bevel-gears $b$ $b^2$, the shaft D having the notched flange $c$, and the stop-spring $s^8$, engaging with said flange, in combination with the hub of the trip-hand, for turning the latter by key, and stopping the same at zero, as herein set forth.

5. The guard pawl or pawls $g$ $g^2$, arranged with reference to the key-hole $k$, as described, in combination with the key K, and the shaft D adapted to be operated by said key, the object of the same being to insure turning the trip-hand backward to zero when it is reset.

6. The combination of the shafts A B C, gearing P W $W^2$, ratchet-wheels R $R^2$, spring-retracted slides S $S^2$, the feed-pawl and hammer F, and the feed pawl $F^2$, with the trip-hand H, permanent hand $H^2$, hundreds-dial $H^3$, and bell or gong G, for simultaneously registering units on two dials, sounding an alarm after the registration of each unit, and actuating the hundreds-dial instantaneously at the proper moment in the manner herein set forth.

J. W. FOWLER.
DANIEL F. LEWIS.
W. H. SMITH.
LOUIS FISCHER.

Witnesses:
ISIDOR GRAYHEAD,
JAS. L. EWIN.